3,266,917
VISCOSITY STABILIZED CLAY SLURRY
Edgar W. Sawyer, Jr., Metuchen, and Michael Pavol, Jr., Summit, N.J., assignors to Minerals & Chemicals Philipp Corporation, Township of Woodbridge, N.J., a corporation of Maryland
No Drawing. Filed Oct. 18, 1965, Ser. No. 497,541
16 Claims. (Cl. 106—72)

This application is a continuation-in-part of a copending application, Serial No. 313,182, filed Oct. 2, 1963, now abandoned.

This invention has to do with aqueous kaolin clay slurries. The invention is particularly directed to concentrated clay slurries which contain a condensed phosphate as a clay dispersant.

Koalin clay is a white, finely divided hydrated aluminum silicate mineral that is widely used as a coating or filler material in the production of paper goods. For such use, the clay is frequently supplied commercially as a concentrated aqueous slurry containing about 70 percent clay solids (i.e., 70 parts by weight clay to 30 parts by weight of water). Alternatively, the clay is slurried at about 70 percent solids in a coating plant. In order to provide high solids clay slurries of sufficient fluidity to be pumped and to permit the formulation of high solids coating compositions, a clay dispersing agent, usually a soluble alkali metal salt of a condensed phosphate, must be incorporated into the clay slurry. The dispersed slurry is then mixed with adhesive solution to provide the coating composition, usually called a "coating color." When high solids slurries of kaolin clay are stored, the condensed phosphate clay dispersant frequently decreases in effectiveness, as evidenced by the fact that the viscosity of the slurry increases substantially. Thus, a 70 percent solids slurry of kaolin clay may be very fluid when freshly formulated but semisolid and nonpumpable after it has been stored for a month. The action of micro-organisms in the slurry is believed to account for the reversion of the condensed phosphate dispersant to a lower phosphate (orthophosphate) which is not an effective clay dispersant. Slurries that are contaminated with small amounts of organic materials appear to be especially susceptible to viscosity buildup. These organic materials mays be present, for example, as a result of clay processing.

Accordingly, an object of this invention is the provision of dispersed concentrated slurries of kaolin clay which have a reduced tendency to thicken during aging.

A more specific object is the provision of chemically stabilized dispersed concentrated slurries of kaolin clay.

Stated in another manner, an object is the provision of means for stabilizing polyphosphate clay dispersants in a concentrated aqueous slurry of kaolin clay.

Still another object is the provision of means for imparting long enduring fluidity to dispersed slurries of clay which have already thickened and have become excessively viscous.

A further object is to achieve the foregoing objectives without imparting an objectionable color or odor to the clay slurry.

Stated briefly, in accordance with this invention, an extremely small amount of a water-soluble alkali metal salt of a substituted phenol is incorporated into a polyphosphate dispersed concentrated aqueous slurry of kaolin clay for the purpose of minimizing viscosity increase of the slurry when the slurry is aged, as during storage. In accordance with one form of the invention, the substituted phenolic compound is incorporated into a freshly prepared fluid slurry of the clay, whereby excessive thickening of the slurry during aging is prevented. Still in accordance with this invention, the substituted phenolic compound is incorporated along with additional polyphosphate dispersing agent into an aged slurry of polyphosphate dispersed clay which has already thickened, thereby fluidize said slurry and to retard greatly further excessive thickening of the slurry.

An advantage of the use of a substituted phenolic compound as an agent to stabilize viscosity of slurries of the clay is that the desired results are achieved without imparting an objectionable color, odor or taste to the slurry. Moreover, the presence of the substituted phenate in the slurry is without adverse effect on most adhesives used in producing paper coating formulations.

Slurries containing kaolin clay in amount within the range of from about 50 percent to about 72 percent by weight are benefited by the incorporation of the substituted phenate, in accordance with this invention. The invention is especially applicable to the improvement of extremely concentrated slurries containing about 65 percent to 72 percent clay solids since viscosity buildup in these highly concentrated slurries is especially troublesome. Exceptionally good results have been realized with dispersed slurries of flotation brightened kaolin. A process for the flotation brightening of kaolin is described in U.S. 2,990,958 to Ernest W. Greene et al. The slurries to which this invention is applicable contain as a dispersing agent an alkali metal salt of a condensed phosphate in amount sufficent to fluidize the freshly prepared aqueous clay slurry. Usually the clay dispersing agent is present in amount within the range of about 0.1 percent to 0.5 percent, especially about 0.3 percent, of the clay weight, on a moisture free clay basis. (Moisture free clay weight is determined by heating the clay to constant weight at 225° F.). Polyphosphate clay dispersants include sodium hexametaphosphate, tetrasodium pyrophosphate, sodium tripolyphosphate and analogous potassium and ammonium compounds. Clay slurries containing only water, kaolin clay and alkali metal phosphate dispersant usually have a pH within the range of from about 5.5 to 6.5. Clay slurry compositions of this invention may also contain an alkali additive, such as sodium hydroxide or ammonium hydroxide in amount sufficient to adjust the pH of the slurry to a suitable value, typically within the range of about 7.0 to 7.5, since polyphosphate clay dispersants are generally more effective in neutral or moderately alkaline clay systems.

Substituted phenolic compounds useful in carrying out this invention are well-known germicides and encompass water-soluble, alkali metal salts of halogen substituted phenols, especially chlorophenols including three mono-, six di-, six tri-, three tetra-, and one penta-chlorophenols. Especially recommended because of availability are sodium o-monochlorophenate, sodium p-monochlorophenate, sodium 2,4-dichlorophenate, and sodium pentachlorophenate. Analogous potassium salts can be used. Water-soluble alkali metal salts of monochloro derivatives of alkyl substituted phenols, e.g., the sodium salt of p-chloro-meta-xylenol are suitable. Excellent results have also been realized with salts of phenyl substituted phenols, as examples of which are sodium o-phenylphenol (o-hydroxybiphenyl) and sodium p-phenylphenol. Also useful are monochloro derivatives of phenyl substituted phenols, namely, sodium 4-chloro-2-phenylphenate, sodium 6-chloro-2-phenylphenate and sodium 2-chloro-4-phenylphenate. Potassium salts analogous with the aforementioned sodium chlorophenolphenate salts are suitable. Mixtures of the aforementioned substituted phenolic compounds, e.g., a mixture of sodium pentachlorophenate with sodium trichlorophenate, can also be used.

Generally speaking, the extent to which the viscosity of the slurry increases during aging will vary inversely with the quantity of substituted phenate incorporated into the slurry. However, the use of excessive phenolic compound must be avoided since excess additive will impart an undesirable color and odor to the slurry and such color and odor may be imparted to a coating composition that is formulated with the slurry. In most instances, the alkali metal salt of the substituted phenol will be employed in amount within the range of about 0.005 percent to 0.1 percent of the slurry weight. The preferred quantity of substituted phenol salt is usually within the range of about 0.01 percent to about 0.03 percent. When used in amount appreciably below 0.005 percent, reduction in viscosity buildup of the clay may not be adequate. On the other hand, when used in amount in excess of 0.1 percent, the additive may impart an objectionable color and odor to the slurry.

The alkali metal salt of the substituted phenol should be employed in the form of a solution or suspension and is incorporated with the clay slurry with mixing at ambient temperature. When employed in the treatment of a slurry which has already aged for a time such that the slurry is nonfluid, it is recommended to fluidize the slurry by incorporating sufficient polyphosphate dispersant (or a mixture of polyphosphate and sodium hydroxide or other alkali) before adding alkali metal salt of the substituted phenol. However, when an aged slurry is still sufficiently fluid to permit uniform mixing of a solution or suspension of the phenolic compound, the phenolic compound can be added before the supplementary quantity of polyphosphate dispersant.

The invention is illustrated by the following examples.

Example I

Experiments were carried out to show the effect of addition of a small amount of the sodium salt of o-phenylphenol to a commercial 70 percent solids slurry of floatation beneficiated kaolin clay containing 0.35 percent, based on the clay weight, of tetrasodium pyrophosphate deflocculating agent. The slurry is supplied commercially under the trade name "Ultra White 90" and is manufactured by the process described in detail in Bulletin No. M4–B117. The process is briefly as follows: A dilute aqueous slip of Georgia kaolin clay containing sodium silicate dispersing agent is subjected to hydraulic classification and a slip of fine size fraction clay obtained in this manner is conditioned for froth flotation with ground limestone (to aid the flotation of finely divided colored impurities), crude tall oil, oil-soluble petroleum sulfonate and fuel oil. The pH of the conditioned slip is adjusted to 9.0 by addition of ammonium hydroxide and the slip subjected to froth flotation with one rougher and three cleaner floats. The froth product is a concentrate of reagentized colored impurities originally in the clay in intimate association with reagentized ground limestone. The machine discharge products of the flotation cells, which are concentrates of brightened clay, are combined, flocced with sulfurous acid, thickened, bleached with zinc hydrosulfite liquor, filtered, repulped with water, refiltered and the filter cake fluidized by addition of tetrasodium pyrophosphate in amount of 0.35 percent of the clay weight. The solids content of the slurry is adjusted to 70 percent by addition of dried flotation beneficiated kaolin clay from a previous operation of the flotation beneficiation plant. This additional clay contains tetrasodium pyrophosphate in amount of 0.35 percent of the clay weight. The pH of the polyphosphate dispersed slurry was 6.1.

A sample of the freshly prepared Ultra White 90 slurry was divided into two portions. Sodium salt of o-phenylphenol was incorporated into one portion of the slurry in amount of 0.03 percent of the slurry weight. The apparent viscosity of each slurry was measured with a Brookfield Viscometer. The slurries were then stored without agitation for one month at ambient temperature of about 70° F. to 80° F. in closed nonsterile metal containers. The viscosity of each slurry was measured at the end of the storage period.

In making measurements of apparent viscosity, shear rates of 10, 20, 50 and 100 r.p.m. were employed for each slurry since apparent viscosity at such shear rates is considered to be of significance in paper coating plants. An appropriate spindle was used for each viscosity range that was measured. Before making viscosity measurements, each slurry was mixed for ten minutes with a peller-type agitator, since in paper coating plants the slurries are usually agitated before being pumped or poured. The results are summarized in table form.

TABLE I.—EFFECT OF SODIUM O-PHENYLPHENATE ON VISCOSITY CHANGE IN POLYPHOSPHATE DISPERSED 70% SOLIDS SLURRY OF FLOTATION BENEFICIATED KAOLIN CLAY

| Rate of Shear, r.p.m. | Untreated Slurry | | Slurry Containing 0.03% by Weight Na O-phenylphenate | |
|---|---|---|---|---|
| | Fresh Slurry Viscosity, cp.[1] | After Storage for 1 month Viscosity, cp.[2] | Fresh Slurry Viscosity, cp.[1] | After Storage for 1 month Viscosity, cp.[3] |
| 10 | 500 | 24,000 | 500 | 2,000 |
| 20 | 350 | 14,000 | 350 | 1,500 |
| 50 | 240 | 6,800 | 220 | 880 |
| 100 | 200 | 4,200 | 180 | 600 |

[1] Measured with #2 spindle.
[2] Measured with #6 spindle.
[3] Measured with #5 spindle.

TABLE II.—EFFECT OF SODIUM PENTACHLOROPHENATE ON VISCOSITY CHANGE IN POLYPHOSPHATE DISPERSED 70% SOLIDS SLURRY OF FLOTATION BENEFICIATED KAOLIN CLAY

| Rate of Shear, r.p.m. | Untreated Slurry | | Slurry Containing 0.02% by Weight Na O-phenylphenate | |
|---|---|---|---|---|
| | Fresh Slurry Viscosity, cp.[1] | After Storage for 1 month Viscosity, cp.[2] | Fresh Slurry Viscosity, cp.[1] | After Storage for 1 month Viscosity, cp.[3] |
| 10 | 500 | 24,000 | 500 | 2,000 |
| 20 | 350 | 14,000 | 400 | 1,300 |
| 50 | 240 | 6,800 | 240 | 720 |
| 100 | 200 | 4,200 | 180 | 480 |

[1] Measured with #2 spindle.
[2] Measured with #6 spindle.
[3] Measured with #5 spindle.

Data in the table for the untreated slurry of beneficiated kaolin show that during storage the apparent viscosity of the slurry increased from about 20 to 50 fold (depending on rate of shear at which viscosity was measured). This indicates that a substantial amount of the polyphosphate dispersant had been deactivated during storage and was no longer effective in maintaining the slurry in fluid condition. Data for the aged slurry containing sodium orthophenylphenate additive show that during storage the apparent viscosity of the slurry increased only about 3 to 4 fold. A comparison of this data with data for the slurry aged without sodium orthophenylphenate additive shows that the viscosity increase of the slurry was roughly about ten times as great when sodium orthophenylphenate additive was not used. The data therefore show that the polyphosphate clay dispersant was ten times as effective in the slurry when used in combination with sodium orthophenylphenate.

Example II

The procedure of Example I was repeated using 0.02 percent by weight of the sodium salt of pentachlorophenol as the substituted phenolic compound. The results, summarized in Table II, were generally similar to results realized with 0.03 percent by weight of the sodium salt of phenylphenol.

As used in the specification and claims, clay weight refers to the moisture free clay weight, determined by heating the clay to essentially constant weight at 225° F.

We claim:

1. A clay slurry comprising water, about 50 percent to 72 percent by weight of kaolin clay dispersed therein, an alkali metal salt of a condensed phosphate in amount sufficient to fluidize said slurry and a small amount of a water-soluble alkali metal salt of a substituted phenol of the group consisting of chlorophenol, monochloro derivative of alkyl substituted phenol, phenyl substituted phenol, and monochloro derivative of phenyl substituted phenol in amount sufficient to reduce substantially the viscosity increase that would normally take place in the absence of said salt.

2. The composition of claim 1 wherein said salt is sodium orthophenylphenate.

3. The composition of claim 1 wherein said salt is sodium pentachlorophenate.

4. A clay composition in the form of a concentrated flowable aqueous slurry and comprising water, from about 65 percent to 72 percent by weight of flotation brightened kaolin clay, an alkali metal salt of a condensed phosphate as a clay dispersant in amount within the range of from about 0.1 percent to about 0.5 percent of the weight of the clay, sodium hydroxide in amount sufficient to adjust the pH of the slurry to a value within the range of 7.0 to 7.5 and a small amount of water-soluble alkali metal salt of a phenyl substituted phenol in amount sufficient to reduce substantially the viscosity increase that would normally take place in the absence of said salt.

5. The composition of claim 4 in which the amount of said alkali salt of a phenyl substituted phenol is insufficient to affect substantially the color and odor of said slurry.

6. The composition of claim 4 in which said salt is sodium orthophenylphenate and is present in amount within the range of about 0.005 percent to about 0.1 percent of the weight of said slurry.

7. The composition of claim 4 in which said sodium salt of orthophenylphenate is present in amount within the range of about 0.01 percent to about 0.03 percent of the weight of said slurry.

8. A clay composition in the form of a concentrated flowable aqueous slurry and comprising water, from about 65 percent to 72 percent by weight of flotation brightened kaolin clay, an alkali metal salt of a condensed phosphate as a clay dispersant in amount within the range of about 0.1 percent to about 0.5 percent of the weight of the clay, sodium hydroxide in amount sufficient to adjust the pH of the slurry to a value within the range of 7.0 to 7.5 and a small amount of a water-soluble alkali metal salt of a chloro substituted phenol in amount sufficient to reduce substantially the viscosity increase that would normally take place in the absence of said salt.

9. A composition of claim 8 in which the amount of said alkali salt of a chloro substituted phenol is insufficient to affect substantially the color and odor of said slurry.

10. The composition of claim 8 in which said salt is sodium pentachlorophenate and is present in amount within the range of about 0.005 percent to about 0.1 percent of the weight of said slurry.

11. The composition of claim 8 in which said salt is sodium pentachlorophenate and is present in amount within the range of about 0.01 percent to about 0.03 percent of the weight of said slurry.

12. A method for reducing the extent to which an aqueous slurry of flotation brightened kaolin clay having a clay solids content within the range of about 65 percent to 72 percent by weight and containing alkali salt of condensed phosphate as a dispersant in amount within the range of about 0.1 percent to 0.5 percent of the clay weight increases in viscosity during storage which comprises: incorporating a small amount of a water-soluble alkali metal salt of a substituted phenol into said slurry before said slurry thickens appreciably as a result of aging, said amount of salt of substituted phenol being sufficient to reduce substantially the viscosity increase that would normally take place in the absence of said salt and said substituted phenol being selected from the group consisting of chlorophenol, monochloro derivative of alkyl substituted phenol, phenyl substituted phenol and monochloro derivative of phenyl substituted phenol.

13. In the preparation of a dispersed aqueous slurry of flotation brightened kaolin clay containing about 65 percent to 72 percent by weight clay solids and containing an alkali metal salt of a condensed phosphate in amount within the range of about 0.1 to 0.5 percent of the clay weight as a clay dispersant, the improvement which comprises: substantially immediately after said slurry is prepared incorporating from about 0.005 percent to about 0.100 percent by weight of a water-soluble alkali metal salt of a substituted phenol into said slurry as a viscosity stabilizing agent, said substituted phenol being selected from the group consisting of chlorophenol, monochloro derivative of alkyl substituted phenol, phenyl substituted phenol, and monochloro derivative of phenyl substituted phenol.

14. A method for treating an alkali polyphosphate dispersed aqueous slurry of flotation brightened kaolin clay containing about 65 percent to 72 percent by weight clay solids and which has thickened as a result of aging which comprises: incorporating additional alkali polyphosphate into said slurry in amount sufficient to fluidize said slurry and adding from about 0.005 percent to about 0.100 percent by weight of a water-soluble alkali metal salt of a substituted phenol as a viscosity stabilizing agent, said substituted phenol being selected from the group consisting of chlorophenol, monochloro derivative of alkyl substituted phenol, phenyl substituted phenol, and monochloro derivative of phenyl substituted phenol.

15. A clay composition in the form of a concentrated flowable aqueous slurry and comprising water, flotation beneficiated kaolin clay in amount within the range of about 65 percent to about 72 percent by weight, tetrasodium pyrophosphate as a clay dispersing agent in amount within the range of from about 0.1 percent to about 0.5 percent of the weight of the clay and an alkali metal salt of a chloro substituted phenol in amount of about 0.005 percent to about 0.100 percent of the weight of the composition.

16. A clay composition in the form of a concentrated flowable aqueous slurry and comprising water, flotation beneficiated kaolin clay in amount within the range of about 65 percent to about 72 percent by weight, tetrasodium pyrophosphate as a clay dispersing agent in amount within the range of from about 0.1 percent to about 0.5 percent of the weight of the clay and an alkali metal salt of a phenyl substituted phenol in amount of about 0.005 percent to about 0.100 percent of the weight of the composition.

References Cited by the Examiner
UNITED STATES PATENTS
1,745,102  1/1930  Lambie et al. _____ 106—72

TOBIAS E. LEVOW, *Primary Examiner.*

J. E. POER, *Assistant Examiner.*

UNITED STATES PATENT OFFICE
CERTIFICATE OF CORRECTION

Patent No. 3,266,917                                        August 16, 1966

Edgar W. Sawyer, Jr., et al.

It is hereby certified that error appears in the above numbered patent requiring correction and that the said Letters Patent should read as corrected below.

Column 2, line 3, after "thereby" insert -- to --; column 4, line 8, for "peller-type" read -- propeller-type --; same column 4, TABLE II, heading to the last column, for "Slurry Containing 0.02% by Weight Na O-phenylphenate" read -- Slurry Containing 0.02% by Weight Na Pentachlorophenate --.

Signed and sealed this 1st day of August 1967.

(SEAL)
Attest:

EDWARD M. FLETCHER, JR.                         EDWARD J. BRENNER
Attesting Officer                                          Commissioner of Patents